US008412547B1

(12) United States Patent
Leeb et al.

(10) Patent No.: US 8,412,547 B1
(45) Date of Patent: Apr. 2, 2013

(54) COMMERCE SERVER ARCHITECTURE AND METHOD FOR USING SAME

(75) Inventors: Gunter Leeb, Austin, TX (US); David J. Reese, Austin, TX (US); Cheryl W. Scott, Austin, TX (US); Jacob Levirne, Quincy, MA (US); Matthew A. Howitt, Austin, TX (US); John W. Kamm, IV, Austin, TX (US); Timothy Dowling, Seattle, WA (US)

(73) Assignee: Trilogy Development Group, Inc., Austin, TX (US)

( * ) Notice: Subject to any disclaimer, the term of this patent is extended or adjusted under 35 U.S.C. 154(b) by 659 days.

(21) Appl. No.: 09/841,722

(22) Filed: Apr. 24, 2001
(Under 37 CFR 1.47)

Related U.S. Application Data

(60) Provisional application No. 60/199,297, filed on Apr. 24, 2000.

(51) Int. Cl.
*G06Q 10/00* (2006.01)
(52) U.S. Cl. .................................. 705/7.11; 705/1.1
(58) Field of Classification Search .................. 705/1, 8, 705/7.11, 1.1
See application file for complete search history.

(56) References Cited

U.S. PATENT DOCUMENTS

| | | | | |
|---|---|---|---|---|
| 4,799,156 A | * | 1/1989 | Shavit et al. | 705/26 |
| 4,992,940 A | | 2/1991 | Dworkin | 364/401 |
| 5,193,056 A | | 3/1993 | Boes | 364/408 |
| 5,361,199 A | | 11/1994 | Shoquist et al. | 705/26 |
| 5,515,524 A | | 5/1996 | Lynch et al. | 395/500 |
| 5,694,551 A | | 12/1997 | Doyle et al. | 705/26 |
| 5,708,798 A | | 1/1998 | Lynch et al. | 395/500 |
| 5,710,887 A | | 1/1998 | Chelliah et al. | 395/226 |
| 5,732,400 A | | 3/1998 | Mandler et al. | 705/26 |

(Continued)

FOREIGN PATENT DOCUMENTS

| | | |
|---|---|---|
| WO | WO 93/24892 | 12/1993 |
| WO | WO 98/19259 | 5/1998 |
| WO | WO03075195 | 9/2003 |

OTHER PUBLICATIONS

Information on Alibaba-Inc.Com, 1999-2000.*

(Continued)

*Primary Examiner* — Naresh Vig
(74) *Attorney, Agent, or Firm* — Hamilton & Terrile, LLP; Kent B. Chambers

(57) ABSTRACT

A commerce router is disclosed. Such a commerce router includes a plurality of commercial transaction databases and an application server module. Each of the databases can contain commercial transaction information related to one of a number of offering types (e.g., categories of products, services and/or the like). Application server module is communicatively coupled to the each one of the databases. The application server module can be configured to receive a request by virtue of being configured to communicate information regarding the request to the database for inclusion in the commercial transaction information. The application server module can also be configured to allow review of the request by virtue of being configured to communicate information regarding the request from the database by accessing the commercial transaction information. Similarly, the application server module can be configured to receive a response by virtue of being configured to communicate information regarding the response to the database for inclusion in the commercial transaction information. The application server module can also be configured to allow review of the response by virtue of being configured to communicate information regarding the response from the database by accessing the commercial transaction information.

34 Claims, 10 Drawing Sheets

U.S. PATENT DOCUMENTS

| | | | | |
|---|---|---|---|---|
| 5,734,150 | A | 3/1998 | Brown et al. | 235/381 |
| 5,742,931 | A | 4/1998 | Spiegelhoff et al. | 705/8 |
| 5,745,681 | A | 4/1998 | Levine et al. | 395/200.3 |
| 5,749,785 | A | 5/1998 | Rossides | 463/25 |
| 5,758,328 | A | 5/1998 | Giovannoli | 705/26 |
| 5,825,651 | A | 10/1998 | Gupta et al. | 364/468.09 |
| 5,842,178 | A | 11/1998 | Giovannoli | 705/26 |
| 5,842,218 | A | 11/1998 | Robinson | 707/102 |
| 5,844,554 | A | 12/1998 | Geller et al. | 345/744 |
| 5,852,809 | A | 12/1998 | Abel et al. | 705/26 |
| 5,873,069 | A | 2/1999 | Reuhl et al. | 705/20 |
| 5,878,400 | A | 3/1999 | Carter, III | 705/20 |
| 5,893,076 | A | 4/1999 | Hafner et al. | 705/28 |
| 5,895,454 | A | 4/1999 | Harrington | 705/26 |
| 5,895,468 | A | 4/1999 | Whitmyer, Jr. | 707/10 |
| 5,918,214 | A | 6/1999 | Perkowski | 705/27 |
| 5,924,082 | A | 7/1999 | Silverman et al. | 75/37 |
| 5,926,817 | A | 7/1999 | Christeson et al. | 707/10 |
| 5,930,779 | A | 7/1999 | Knoblock et al. | 705/412 |
| 5,937,390 | A | 8/1999 | Hyodo | 705/14 |
| 5,940,807 | A | 8/1999 | Purcell | 705/26 |
| 5,950,177 | A | 9/1999 | Lupien et al. | 705/37 |
| 5,960,411 | A | 9/1999 | Hartman et al. | 705/26 |
| 5,963,915 | A | 10/1999 | Kirsch | 709/203 |
| 5,970,470 | A | 10/1999 | Walker et al. | 705/14 |
| 5,970,472 | A | 10/1999 | Allsop et al. | 705/26 |
| 5,970,475 | A * | 10/1999 | Barnes et al. | 705/27 |
| 5,974,406 | A | 10/1999 | Bisdikian et al. | 707/1 |
| 5,978,776 | A | 11/1999 | Seretti et al. | 705/26 |
| 5,978,785 | A | 11/1999 | Johnson et al. | 706/54 |
| 5,987,423 | A | 11/1999 | Arnold et al. | 705/14 |
| 5,991,739 | A * | 11/1999 | Cupps et al. | 705/26 |
| 6,002,854 | A | 12/1999 | Lynch et al. | 395/500.01 |
| 6,014,644 | A | 1/2000 | Erickson | 705/37 |
| 6,016,504 | A | 1/2000 | Arnold et al. | 709/204 |
| 6,029,141 | A | 2/2000 | Bezos et al. | 705/27 |
| 6,047,264 | A | 4/2000 | Fisher et al. | 705/26 |
| 6,055,513 | A * | 4/2000 | Katz et al. | 705/26 |
| 6,061,057 | A | 5/2000 | Knowlton et al. | 345/744 |
| 6,119,101 | A | 9/2000 | Peckover | 705/26 |
| 6,125,352 | A | 9/2000 | Franklin et al. | 705/26 |
| 6,131,087 | A | 10/2000 | Luke et al. | 705/26 |
| 6,134,548 | A | 10/2000 | Gottsman et al. | 707/5 |
| 6,141,006 | A | 10/2000 | Knowlton et al. | 705/26 |
| 6,141,653 | A | 10/2000 | Conklin et al. | 705/80 |
| 6,151,588 | A | 11/2000 | Tozzoli et al. | 705/37 |
| 6,167,378 | A | 12/2000 | Webber, Jr. | 705/8 |
| 6,167,383 | A | 12/2000 | Henson | 705/26 |
| 6,236,972 | B1 * | 5/2001 | Shkedy | 705/1 |
| 6,260,024 | B1 * | 7/2001 | Shkedy | 705/37 |
| 6,282,517 | B1 | 8/2001 | Wolfe et al. | 705/26 |
| 6,282,550 | B1 | 8/2001 | Venkatesan et al. | 707/104.1 |
| 6,295,513 | B1 | 9/2001 | Thackston | 705/26 |
| 6,317,722 | B1 | 11/2001 | Jacobi et al. | 705/14 |
| 6,332,135 | B1 | 12/2001 | Conklin et al. | 705/80 |
| 6,338,050 | B1 | 1/2002 | Conklin et al. | 705/80 |
| 6,339,763 | B1 | 1/2002 | Divine et al. | 705/27 |
| 6,351,738 | B1 | 2/2002 | Clark | 705/37 |
| 6,370,653 | B1 | 4/2002 | Ichinohe et al. | 709/223 |
| 6,405,174 | B1 | 6/2002 | Walker et al. | 705/26 |
| 6,405,176 | B1 | 6/2002 | Toohey | 705/26 |
| 6,405,308 | B1 | 6/2002 | Gupta et al. | 713/1 |
| 6,442,528 | B1 | 8/2002 | Notani et al. | 705/9 |
| 6,507,822 | B1 | 1/2003 | Walker et al. | 705/20 |
| 6,535,294 | B1 | 3/2003 | Arledge et al. | 358/1.15 |
| 6,553,350 | B2 | 4/2003 | Carter | 705/20 |
| 6,574,608 | B1 | 6/2003 | Dahod et al. | 705/26 |
| 6,587,827 | B1 | 7/2003 | Hennig et al. | 705/1 |
| 6,587,835 | B1 * | 7/2003 | Treyz et al. | 705/14 |
| 6,598,026 | B1 | 7/2003 | Ojha et al. | 705/26 |
| 6,604,093 | B1 | 8/2003 | Etzion et al. | 706/47 |
| 6,606,603 | B1 | 8/2003 | Joseph et al. | 705/26 |
| 6,631,365 | B1 | 10/2003 | Neal et al. | 707/2 |
| 6,651,217 | B1 | 11/2003 | Kennedy et al. | 715/507 |
| 6,671,716 | B1 | 12/2003 | Diedrichsen et al. | 709/203 |
| 6,675,294 | B1 | 1/2004 | Gupta et al. | 713/1 |
| 6,725,257 | B1 | 4/2004 | Cansler et al. | 709/219 |
| 6,778,968 | B1 | 8/2004 | Gulati | 705/36 R |
| 6,901,430 | B1 | 5/2005 | Smith | 709/206 |
| 6,920,431 | B2 | 7/2005 | Showghi et al. | 705/26 |
| 6,963,847 | B1 * | 11/2005 | Kennedy et al. | 705/8 |
| 7,069,237 | B1 | 6/2006 | Tate | 705/26 |
| 7,165,041 | B1 | 1/2007 | Guheen et al. | 705/26 |
| 2001/0011222 | A1 * | 8/2001 | McLauchlin et al. | 705/1 |
| 2002/0013731 | A1 | 1/2002 | Bright et al. | 705/22 |
| 2003/0144852 | A1 | 7/2003 | Eckert et al. | 705/1 |
| 2004/0177002 | A1 | 9/2004 | Abelow | 705/14 |

OTHER PUBLICATIONS

Lynn Thomas, The Profitable Power of Cross-Selling and Up-Selling, Oct. 1998, Rough Notes.*

Bob Leduc, How to Increase Your Profits With an "Upselling Offer", Copyright 1999.*

Larry Dotson, Top 7 Upsell Strategies That Will Increase Your Profits, Mar. 2, 2000, Top7Business.com.*

Sheri Cyprus, What is Up-Selling, copyright 2003-2010, Conjecture Corporation.*

"pcOrder's Solutions: Software, Content and Community," http://corporate.pcorder.com/solutions/, Feb. 17, 2000, 1 page.

"pcOrder: Technology Overview," http://corporate.pcorder.com/technology/, Feb. 17, 2000, 1 page.

"pcOrder: Products," http://corporate.pcorder.com/products/, Feb. 17, 2000, 1 page.

"pcOrder: Products/eStation," http://corporate.pcorder.com/products/estation/estation.pdf/, Feb. 17, 2000, 14 pages.

"pcOrder: Products/eStation/Features," http://corporate.pcorder.com/products/estation/features.asp, Feb. 17, 2000, 1 page.

"pcOrder: Products/eStation/Benefits," http://corporate.pcorder.com/oroducts/estation/benefits.asp, Feb. 17, 2000, 2 pages.

Fixmer, Andrew H., "Let's Make a Deal," Now on the Web; New York Times; Late Editions, East Coast; New York; Dec. 24, 1999, p. F.1, extracted on Internet from http://proquest.umi.com on Jan. 17, 2004.

Jastrow, David, "PcOrder connects buyers and sellers," Computer Reseller News, Nov. 15, 1999, Iss. 869, p. 48.

* cited by examiner

COMMERCE SERVER ARCHITECTURE AND METHOD FOR USING SAME

CROSS-REFERENCE TO RELATED APPLICATIONS

This invention claims priority from Provisional Patent Application Ser. No. 60/199,297, entitled "A COMMERCE SERVER ARCHITECTURE AND METHOD FOR USING SAME", filed Apr. 24, 2000, and having G. Leeb, D. Reese, C. Scott, J. Levirne, M. Howitt, J. Kamm and T. Dowling as inventors, the disclosure of which is incorporated herein by reference, in its entirety and for all purposes.

BACKGROUND OF THE INVENTION

1. Field of the Invention

The present invention relates to the aggregation and dissemination of commerce information over a network, and, more particularly, to a method and apparatus for facilitating the processing of commercial transactions over a network.

2. Description of the Related Art

In the stream of commerce, numerous commercial transactions occur between multiple parties to enable a manufacturer to provide a product to an end user, typically referred to as a customer. Historically, many, if not all of the aforementioned commercial transactions were insular and discrete, with respect to the other commercial transactions in the stream of commerce. Each involved business traditions, customs and relationships uniquely tailored to the commercial transaction at hand.

An example of such traditions, customs and relationships is what is known commercially as the distribution channel, or more simply, the channel. The channel is the set of entities, at its furthest extent, that starts with component parts suppliers and terminates with a commercial product's end user. In between are commercial entities such as original equipment manufacturers (OEMs), distributors, resellers (e.g., value-added resellers (VARs)) and retail sales organizations (often referred to as storefronts). Distribution channels have formed in industries such as the computer industry, for example.

From a commercial standpoint, there are a number of efficiencies enjoyed by the various channel entities that spring from both their up-channel and down-channel relationships. These efficiencies are due, in part, to the aggregation that occurs (again, both up-channel and down-channel). Fan-out in the down-channel direction increases the volume of purchasing up-channel for those entities inside the channel. Conversely, as noted, fan-in in the up-channel direction allows up-channel entities to aggregate orders to achieve advantages of scale (e.g., volume purchasing discounts). An example of down-channel relationships (from a small number of producers to a large number of consumers) is the sale of goods from a distributor to a reseller. In such situations, the producers enjoy volume sales (and so may purchase in volume to get volume discounts, but must have the infrastructure to handle such volume), while the consumers avoid the need to purchase in volume (but must pay higher prices as a cost of buying relatively small quantities). A more complete example of such a scenario is sales by an OEM to a distributor that sells to multiple resellers, each of which, in turn, sell to a much larger number of storefronts, who in turn sell to an even larger number of end users.

Typically, each level of the channel deals mainly with the level immediately above or below (e.g., distributors normally only deal with resellers, requiring a federal employer ID number, state sales tax number, proof of incorporation and the like; distributors normally will not deal with end-users; and so on). Of late, however, this distinction has become blurred on occasion (e.g., distributors building products to the specifications of a reseller's customers; OEMs that sell in the channel, but also direct; and so on). However, a common process in channel relationships, and indeed in business relationships in general, is the process of aggregating and analyzing offers for sale of products (or services or the like) by a party wishing to purchase such products (or services or the like). Such a process is common in end-user/reseller, reseller/distributor, government entity/reseller, and other such relationships. One example is the request for quotation (RFQ) process. As used herein, the term "RFQ" is understood to include, but not be limited to, requests for quote, request for services (RFS), request for information (RFI), request for proposal (RFP) and the like, and is not to be limited to a legal understanding of such terms.

Presently, the process of issuing an RFQ, bidding on the RFQ and awarding a contract based on a winning bid is a cumbersome and awkward affair. For example, a computer reseller (and distributor) must often perform many of the steps of the RFQ process manually. This includes reviewing product descriptions in distributor catalogs, reviewing current distributor relationships (depending on the products desired), calling or faxing requests for quotation to the selected distributors, contacting the distributors to ensure the quotation will be provided in a timely manner, the distributor's having to send or fax their quotation, ensuring all selected distributors have responded (or have elected not to respond), physically aggregating and organizing all the bids, comparing the bids and selecting the winning bid (even though the bids may not exactly reflect the items requested, and even though no information regarding the substituted items is available to the reseller). These hurdles, and more, await the unwary reseller who wishes to fill a customer's order while maximizing (or even achieving) profitability. Moreover, the process does not even take into consideration the services not provided by the reseller that the customer may desire (e.g., maintenance, customer support, extended warranty and the like).

Thus, inefficiencies exist in the traditional process of requesting quotations, both in terms of the time and resources involved, and so such a process is difficult to manage. For example, merchants (e.g., distributors) who would otherwise sell to the given buyers (e.g., resellers) might be unknown to those buyers, as small distributors (regional or otherwise) are often unknown to resellers in other areas. This can translate to the affected merchants never being considered for (i.e., notified of) an RFQ. Moreover, an RFQ process with the aforementioned infirmities can also encounter late or misdirected RFQs and/or responses. If such RFQs/responses are not lost, their lateness can cause the award to take place much later than need be (e.g., waiting for a bid from a distributor that is particularly desirable because of pricing, previous relationship or other such reasons). Conversely, the reseller may have already received bids from the selected distributors, but must hold bidding open (i.e., wait until the bidding period has elapsed) in order to allow the respondents to change their bids, should one or more of them so desire.

Such a manual RFQ process is also hard to manage. Several problems present themselves. As noted, there may be distributors the reseller would like to have bid on the given RFQ. Making a determination as to which distributors are preferable is also difficult, and will often result in the reseller issuing the RFQ to all distributors with whom the reseller has relationships. Further, analyzing quotations is difficult, particularly when the responses received contain substitutions, additions and/or deletions, or when the quotations are from different channel entities (e.g., OEMs and distributors) that offer different pricing structures, service, capabilities, and the like. Moreover, the management of channel relationships and the enforcement of channel agreements (e.g., agreements that avoid OEMs selling direct to end-users when they're also selling to distributors (for sale to resellers, and ultimately end-users)) is also problematic. The traditions and customs that have evolved over many years of dealings between merchants in the ordinary course of business have thus grown to a point that the process has become unwieldy and, in some cases, unusable.

Moreover, such a manual RFQ process is also deficient due to its incompleteness. A reseller will often have a number of varied needs with regard to the purchase of a given product (e.g., a computer system). The reseller will likely need not only the given product, but will also have requirements for accessories not offered by the original merchant, product support, financing, installation, maintenance, administration and the like. In fact, the reseller may fail to recognize one or more of these needs, and be forced to secure such services at a later date.

Further, because of the wide array of products and service that may require procurement, the problems facing such a procurement process are also greatly increased. For example, in such a scenario, instead of having to send out an RFQ to one group, the reseller must send out separate RFQs, each directed to a given need (accessories, installation and so on), to a group of merchants providing products, services or the like that meet such a need. This turns an otherwise awkward process into a completely unmanageable one.

SUMMARY OF THE INVENTION

In one embodiment of the present invention, a commerce router is disclosed. Such a commerce router exists in a commerce architecture, and can include support for multiple categories of products, services and/or the like.

In an embodiment of the present invention, a commerce router is disclosed. Such a commerce router includes a plurality of commercial transaction databases and an application server module. Each of the databases can contain commercial transaction information related to one of a number of offering types (e.g., categories of products, services and/or the like). Application server module is communicatively coupled to the each one of the databases.

In one aspect of this embodiment, the application server module is configured to receive a request by virtue of being configured to communicate information regarding the request to the database for inclusion in the commercial transaction information. The application server module can also be configured to allow review of the request by virtue of being configured to communicate information regarding the request from the database by accessing the commercial transaction information. Similarly, the application server module can be configured to receive a response by virtue of being configured to communicate information regarding the response to the database for inclusion in the commercial transaction information. The application server module can also be configured to allow review of the response by virtue of being configured to communicate information regarding the response from the database by accessing the commercial transaction information.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

Introduction

The present invention provides a software architecture, more specifically a commerce router that provides an extensible commerce architecture capable of supporting commercial transactions that include RFIs, RFPs, RFQs/RFSs and fulfillment thereof. Such a commerce router provides a commercial transaction processing system capable of operating over a network such as the Internet using, for example, a WWW interface such as a browser. Moreover, such a commerce router allows a buyer to submit a request to merchants servicing multiple market segments, such as products, services and the like.

Example Wide-Area Network

Figure 1:
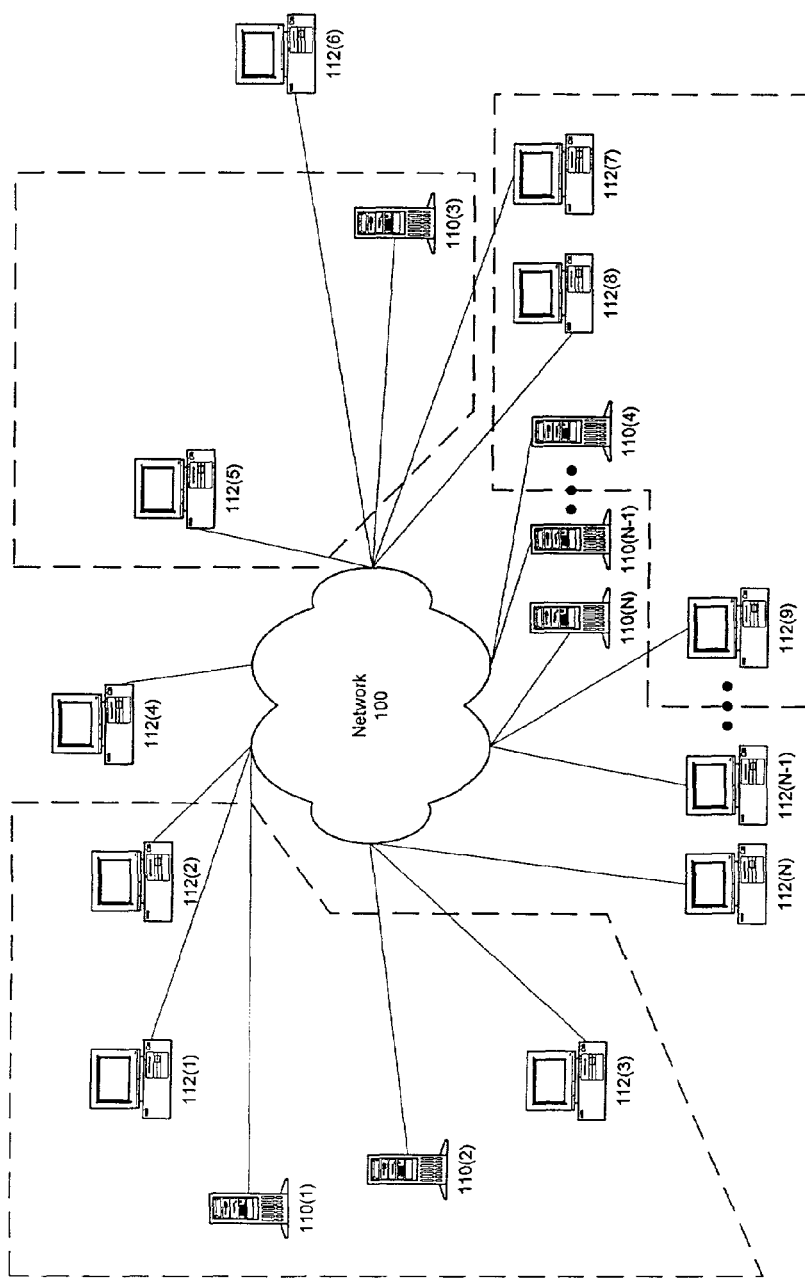
FIG. 1 is a block diagram illustrating a network environment in which a commercial transaction processing system according to the present invention may be practiced.

FIG. 1 is a block diagram illustrating a network environment in which a commercial transaction processing system according to the present invention may be practiced. As is illustrated in FIG. 1, a network 100, such as a private wide area network (WAN) or the Internet, includes a number of networked servers 110(1)-(N) that are accessible by client terminals 112(1)-(N). Communication between client terminals 112(1)-(N) and servers 110(1)-(N) typically occurs over a publicly accessible network, such as a public switched telephone network over ADSL telephone lines or large bandwidth trunks, for example communications channels providing T1 or OC3 service. Client terminals 112(1)-(N) access servers 110(1)-(N) through a service provider, e.g., an Internet service provider such as America On-Line™, Prodigy™, CompuServe™ and the like, by executing application specific software, commonly referred to as a browser, on one of client terminals 112(1)-(N).

One or more of client terminals 112(1)-(N) and/or one or more of servers 110(1)-(N) may be, for example, a computer system of any appropriate design, in general, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or a plurality of I/O devices (i.e. peripheral devices) which are coupled to the system processor and which perform specialized functions. Examples of I/O devices include modems, sound and video devices and specialized communication devices. Mass storage devices such as hard disks, CD-ROM drives and magneto-optical drives may also be provided, either as an integrated or peripheral device. One such example computer system, discussed in terms of client terminals 112(1)-(N) is shown in detail in FIG. 2.

Figure 2:
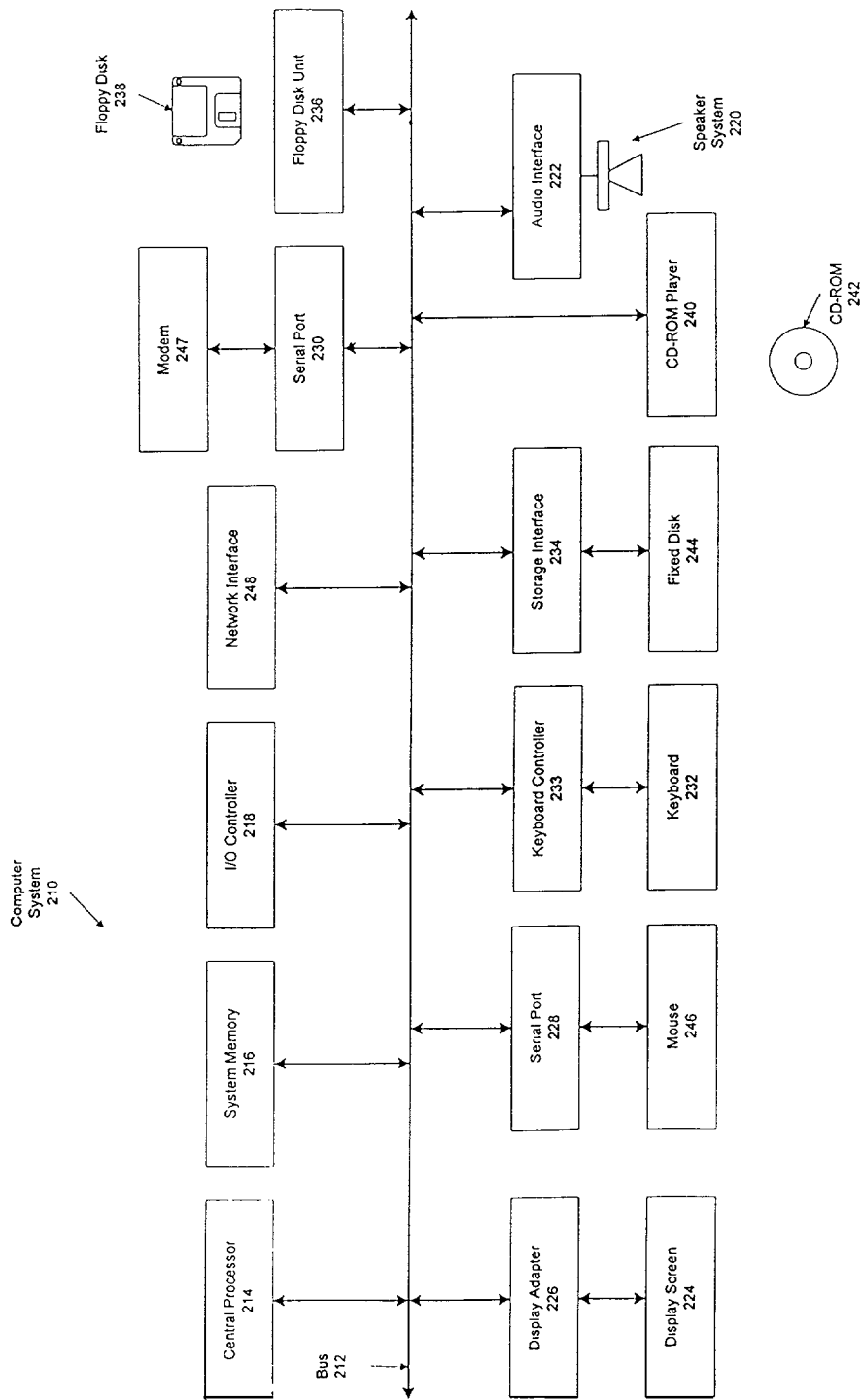
FIG. 2 depicts a block diagram of a computer system suitable for implementing embodiments of the present invention.

FIG. 2 depicts a block diagram of a computer system 210 suitable for implementing the present invention, and example of one or more of client terminals 112(1)-(N). Computer system 210 includes a bus 212 which interconnects major subsystems of computer system 210 such as a central processor 214, a system memory 216 (typically RAM, but which may also include ROM, flash RAM, or the like), an input/output controller 218, an external audio device such as a speaker system 220 via an audio output interface 222, an external device such as a display screen 224 via display adapter 226, serial ports 228 and 230, a keyboard 232 (interfaced with a keyboard controller 233), a storage interface 234, a floppy disk drive 236 operative to receive a floppy disk 238, and a CD-ROM drive 240 operative to receive a CD-ROM 242. Also included are a mouse 246 (or other point-and-click device, coupled to bus 212 via serial port 228), a modem 247 (coupled to bus 212 via serial port 230) and a network interface 248 (coupled directly to bus 212).

Bus 212 allows data communication between central processor 214 and system memory 216, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with computer system 210 are generally stored on and accessed via a computer readable medium, such as a hard disk drive (e.g., fixed disk 244), an optical drive (e.g., CD-ROM drive 240), floppy disk unit 236 or other storage medium. Additionally, applications may be in the than of electronic signals modulated in accordance with the application and data communication technology when accessed via network modem 247 or interface 248.

Storage interface 234, as with the other storage interfaces of computer system 210, may connect to a standard computer readable medium for storage and/or retrieval of information, such as a fixed disk drive 244. Fixed disk drive 244 may be a part of computer system 210 or may be separate and accessed through other interface systems. Many other devices can be connected such as a mouse 246 connected to bus 212 via serial port 228, a modem 247 connected to bus 212 via serial port 230 and a network interface 248 connected directly to bus 212. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 2 to be present to practice the present invention. The devices and subsystems may be interconnected in different ways from that shown in FIG. 2. The operation of a computer system such as that shown in FIG. 2 is readily known in the art and is not discussed in detail in this application. Code to implement the present invention may be operably disposed or stored in computer-readable storage media such as one or more of system memory 216, fixed disk 244, CD-ROM 242, or floppy disk 238. Additionally, computer system 210 may be any kind of computing device, and so includes personal data assistants (PDAs), network appliance, X-window terminal or other such computing device.

It will be noted that the variable identifier "N" is used in several instances in FIG. 2 to more simply designate the final element (e.g., servers 110(1)-(N) and client terminals 112(1)-(N)) of a series of related or similar elements (e.g., servers and client terminals). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 210). It is to be understood that such depicted architectures are merely example, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 3:
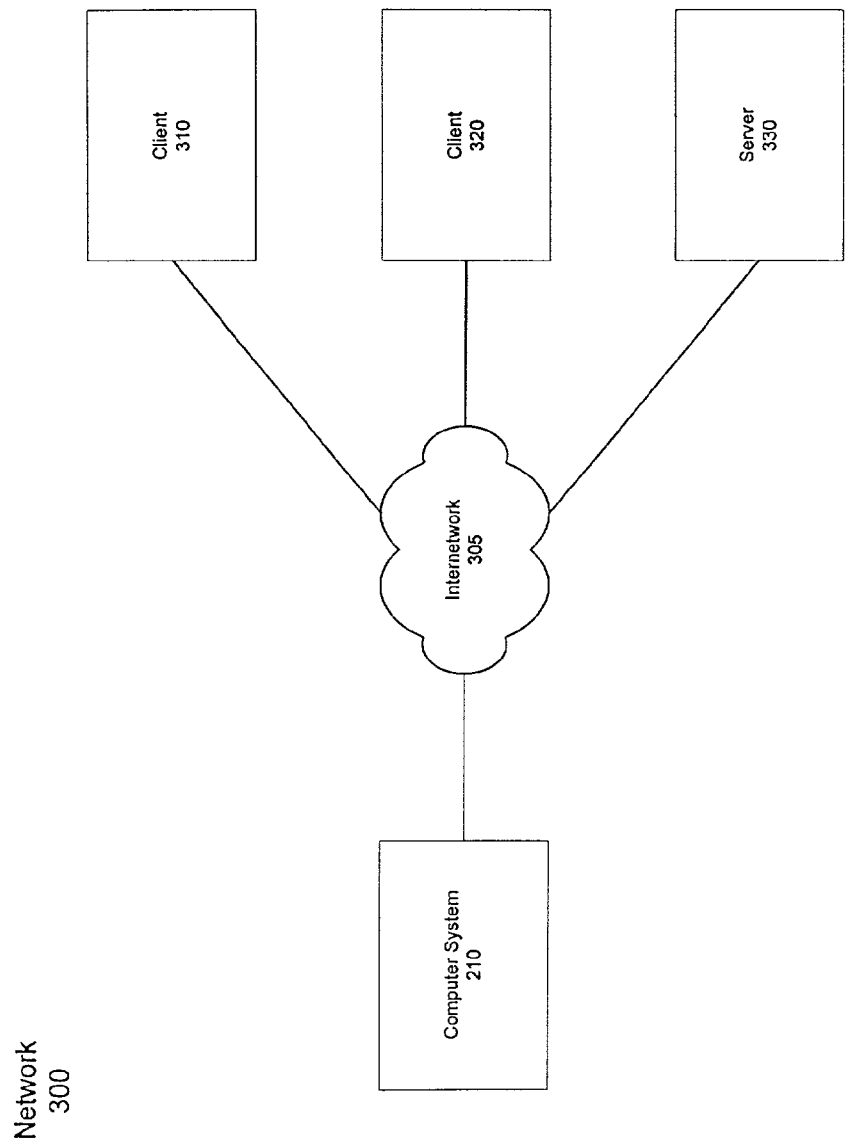
FIG. 3 depicts the interconnection of the computer system of FIG. 2 to a number of client systems.

FIG. 3 is a block diagram depicting a network 300 in which computer system 210 is coupled to an internetwork 305, which is coupled, in turn, to client systems 310 and 320, as well as a server 330. Internetwork 305 (e.g., the Internet) is also capable of coupling client systems 310 and 320, and server 330 to one another. With reference to computer system 210, modem 247, network interface 248 or some other method can be used to provide connectivity from computer system 210 to internetwork 305. Computer system 210, client system 310 and client system 320 are able to access information on server 330 using, for example, a web browser (not shown). Such a web browser allows computer system 210, as well as client systems 310 and 320, to access data on server 330 representing the pages of a website hosted on server 330. Protocols for exchanging data via the Internet are well known to those skilled in the art. Although FIG. 3 depicts the use of the Internet for exchanging data, the present invention is not limited to the Internet or any particular network-based environment. It should be noted that, in an architecture according to embodiments of the present invention, not only is transaction information routed to other client systems, but to a number of other server or host systems that receive the given transaction information.

Example Commerce Router

Figure 4A:
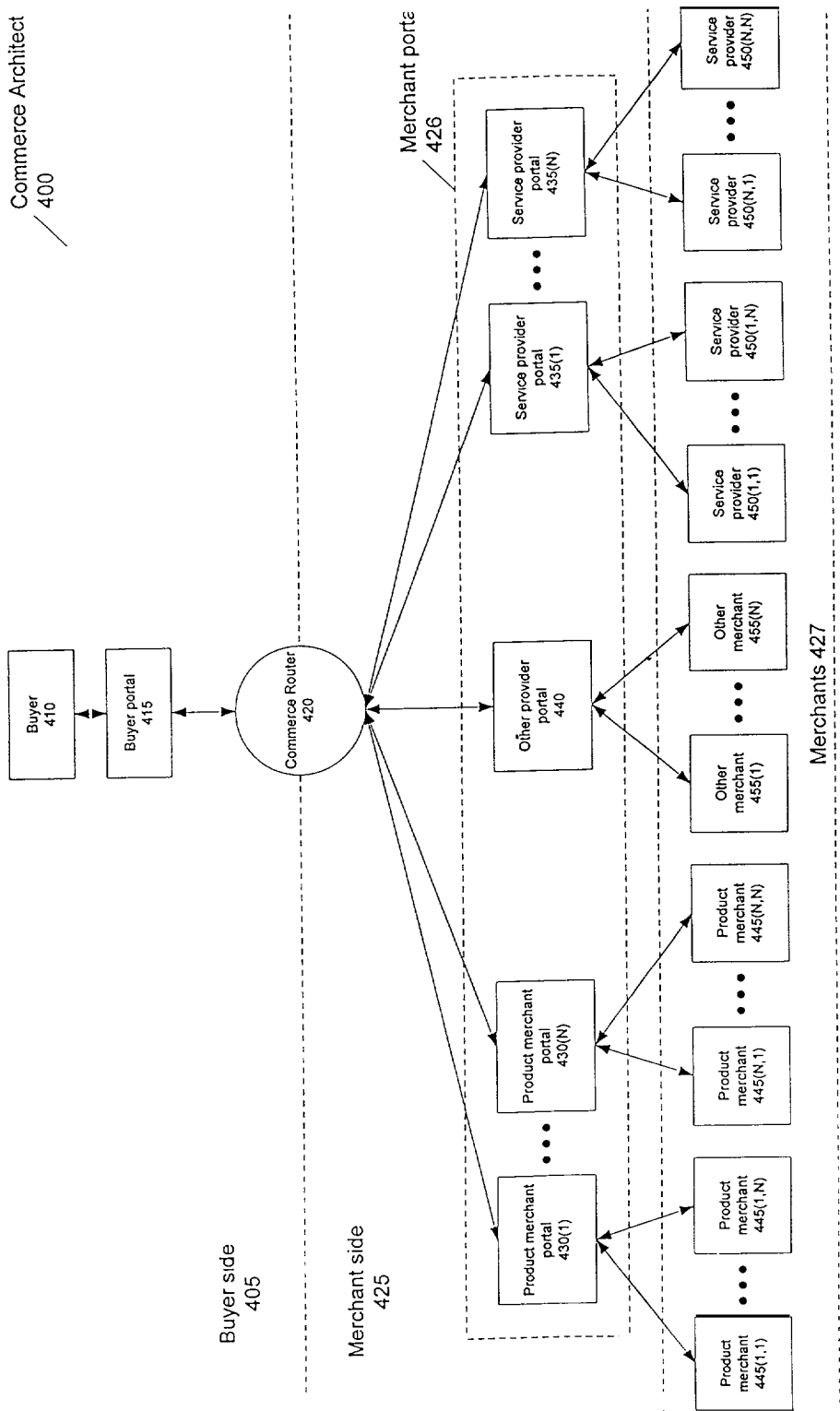
FIG. 4A is a block diagram illustrating an example commerce architecture that includes a commerce router according to an embodiment of the present invention.

FIG. 4A is a block diagram illustrating an example of a commerce architecture 400. On a buyer side 405 of commerce architecture 400, a buyer 410 accesses a buyer portal 415 in order to review and procure goods and services available via commerce architecture 400. To provide such capabilities, buyer portal 415 is coupled to a commerce router 420, which presents various merchants offerings of products, services and the like to buyer 410 via buyer portal 415. In a networked environment that supports hypertext pages (e.g., the WWW on the Internet), buyer portal 415 can be a website that is accessed by buyer 410. In such a scenario, commerce router 420 enables buyer portal 415 to present functionalities such as those discussed herein.

On merchant side 425 of commerce architecture 400, commerce router 420 is coupled to a number of portals (merchant portals 426) that permit various types of merchants (merchants 427) access to information regarding requests submitted by buyer 410. It should be noted that, although such requests are referred to herein in terms of their being stored locally to commerce router 420, such a configuration need not be the case. Buyer requests may be located remotely to commerce router 420, and even hosted by another organization. In fact, such requests can be stored at any location in (or outside of) commerce architecture 400 without appreciable effect on the functionality offered by commerce architecture 400.

As noted, merchants 427 access requests from buyer 410 and respond thereto via one or more of a number of merchant portals (merchant portals 426). Merchant portals 426 include product merchant portals 430(1)-(N), service provider portals 435(1)-(N) and an other provider portal 440. As with buyer portal 415, merchant portals 426 will typically be one or more websites (or a website with various access methods and privilege levels) that are accessed by one or more of merchants 427 via the Internet. Merchants 427, accessing commerce router 420 in order to respond to requests from buyer 410, include product merchants 445(1,1)-(N,N), service providers 450(1,1)-(N,N) and other providers 455(1)-(N). Information identifying products, services and the like offered by merchants 427 is made available to buyer 410 via a catalog database (described subsequently). Product merchants 445(1,1)-(N,N) are merchants that offer goods for purchase by buyer 410. In similar fashion, service providers 450(1,1)-(N,N) offer various services to buyer 410.

Buyer 410 may interact with buyer portal 415 (and so the information available from commerce router 420) in a variety of ways. Buyer 410 may elect simply to inquire as to information on a given product or service (or general descriptions of such products or services) by issuing a request for information (RFI) or by browsing or searching a catalog of available products, services or the like, for example. Alternatively, buyer 410 may issue a request for proposal (RFP), by which buyer 410 requests merchants 427 to provide proposals of products and/or services that meet the needs outlined by buyer 410 in the RFP. Yet another alternative available to buyer 410 is to issue a request for quote (RFQ; when issued for services, this can be referred to as a request for services (RFS)). In that case, buyer 410 requests that merchants 427 provide quotations in response to the request thus issued, for the product(s), service(s) or the like listed in the RFQ (or proposed product(s), service(s) or the like intended by the given merchant to meet the needs of buyer 410 described in the RFQ, either wholly or partially). It will be noted that an RFP is distinguished from an RFQ by the fact that an RFP is typically couched in terms of a description of requirements (e.g., a computer having certain performance characteristics) rather than in terms of specific products or services (e.g., a specific manufacturer and model). It will be noted that RFIs, RFPs, RFQs/RFSs and other such inquiries are referred to generally herein as requests.

Once a merchant (i.e., one of merchants 427) has received a request, the merchant reviews the request and decides whether or not to respond. If the merchant chooses to respond, the merchant gathers the necessary information, creates a response and submits the response to buyer 410. In the case of RFIs, the response is merely informational in nature, allowing buyer 410 to review the information thus submitted. Buyer 410, having reviewed one or more such responses, is then able to determine whether or not to proceed with purchasing one or more of the products, services and/or the like listed in the request. In fact, buyer 410 can convert the RFI into an RFP or an RFQ in order to receive proposals or quotations on the requested products, services and/or the like, leading to the following possible actions.

In the case of RFPs and RFQs (RFSs), buyer 410 typically selects a response from those submitted by merchants 427 as a winning response. In terms of an RFQ or RFS, such a response can also be referred to as a quote or bid. Once a winning response is selected, buyer 410 and the winning merchant complete the purchase of the product(s), service(s) or the like. This can be accomplished by buyer 410 providing a credit card number, purchase order (P.O.) number or the like to the winning merchant. In turn, the winning merchant delivers the product(s), provides the services, or the like, after which the buyer will inspect the product(s) or review the services, and either accept or reject the proffered goods/services. If accepted, buyer 410 pays the winning merchant (if buyer 410 has not yet done so). Further, there may be a number of additional products and services to be provided, including installation (along with any necessary products (e.g., accessories, peripherals, installation hardware and the like)), training, maintenance and so on.

In fact, a wide variety of products, services and the like can be offered through commerce architecture 400, and can even be so broad as to include any saleable good, service or other item. Commerce architecture 400, via commerce router 420, allows buyer 410 to request any combination of products, services and the like, or can automatically generate such requests on behalf of buyer 410. Thus, each of product merchant portals 430(1)-(N) is typically directed to different types of products (e.g., computers, heavy equipment, chemicals, consumables and so on), while each of service provider portals 435(1)-(N) is typically directed to different types of services (e.g., computer installation, contract manufacturing, professional services, temporary workers and so on). Other provider portal 440 allows merchants providing other saleable items (e.g., real estate) to have access to buyers via commerce architecture 400.

Each of product merchant portals 430(1)-(N), service provider portals 435(1)-(N) and other provider portal 440 support access by multiple merchants. While a request need not be sent to multiple merchants, buyer 410 will often desire to send the request to more than one merchant to allow a comparison between merchants' responses in order to compare responses and ensure that buyer 410 receives the best possible bargain (given the constraints imposed thereby). This will in fact normally be the case. Thus, product merchants 445(1,1)-(1,N) access product merchant portal 430(1) in order to respond to requests for the type of product to which product merchant portal 430(1) is tailored. The same holds for product merchants 445(2,1)-(N,N) with regard to product merchant portals 430(2)-(N), respectively. In similar fashion, service providers 450(1,1)-(1,N) access service provider portal 435(1) in order to respond to requests for the type of service for which service provider portal 435(1) is designed. The same holds for service providers 450(2,1)-(1,N) with regard to service provider portals 435(2)-(N), respectively. This also holds for other merchants 455(1)-(N) accessing other provider portal 440.

Typically, the decision to include a given product, service or the like in a given request rests initially with buyer 410, as would be expected. However, this need not be the case. For example, buyer 410 can set buyer preferences to request information (or include in a proposal or include in a quotation or so on) for any accessory of a product in a request. Alternatively, such information (or proposal line item or quotation line item or the like) could be requested for services related to a given product or service or the like. So if buyer 410 requested a quotation for a given computer, information regarding accessories for that computer (e.g., carrying case, printer, additional batteries and so on for a laptop computer), as well as services (training, maintenance and the like), could be also requested.

An extension of this concept is the ability of commerce router 420 to intelligently make such requests on behalf of buyer 410. This can even provide buyer 410 with information (or proposals or quotes or the like) for products, services and the like which are completely unknown to buyer 410. Using the example of the laptop, an intelligent agent within commerce router 420 reviews the request submitted by buyer 410 and decides that training for the use of software provided with the laptop might be desirable to buyer 410. That being the case, a request for such training is generated automatically by commerce router 420 and routed to the appropriate one of service provider portals 435(1)-(N), for response by the respective service providers. In order to ensure (or at least increase the likelihood) that such a service provider is acceptable to buyer 410, commerce router 420 can even use criteria already set by buyer 410 in creating the original request. For example, for one of product merchants 445(1,1)-(N,N), buyer 410 indicates preferences as to acceptable/desirable geographical location, hours of operation, service capabilities, technical support and hours therefor, affiliations, certifications and so on. Commerce router 420 takes this information and applies it to the request to providers of training services, increasing the likelihood that the training service providers responding are acceptable to buyer 410.

Regardless of the origin of the various elements of a given request, commerce router 420 parses the elements of the given request into sub-requests (according to the products, services and the like requested). Each sub-request is then routed to product merchants 445(1,1)-(N,N), service providers 450(1,1)-(N,N) and other providers 455(1)-(N) by sending each sub-request to the appropriate one(s) of product merchant portals 430(1)-(N), service provider portals 435(1)-(N) and/or other provider portal 440, based on the product, service or the like requested (and the existence of the desired product in the catalog for that portal, perhaps even applying decision rules regarding appropriate availability of product). Thus, a request may include products, services and/or other items, which may be related or unrelated, and which (as noted) may be generated by buyer 410 or by commerce router 420. Commerce router 420 parses the information in order to ensure that each element of a request is addressed by one or more of merchants 427.

Additional functionality provided by commerce router 420 includes the ability to automate purchasing at a number of levels in the sales channel. Once buyer 410 and/or commerce router 420 generate the given requests, these requests are routed to product merchants 445(1,1)-(N,N), service providers 450(1,1)-(N,N) and other providers 455(1)-(N) via product merchant portals 430(1)-(N), service provider portals 435(1)-(N) and/or other provider portal 440, with one or more (or none) of product merchants 445(1,1)-(N,N), service providers 450(1,1)-(N,N) and other providers 455(1)-(N) submitting responses, as noted. However, the flow of commerce through commerce router 420 need not stop there. Indeed, certain of product merchants 445(1,1)-(N,N), service providers 450(1,1)-(N,N) and other providers 455(1)-(N) may then become buyers themselves, accessing their respective portals (in the manner depicted in FIG. 4A). Thus, the sales channel can be modeled by examining the various entities having access to commerce router 420. In the alternative, commerce architecture 400 may be designed to include other portals tailored to such further commercial transactions, allowing product merchants 445(1,1)-(N,N), service providers 450(1,1)-(N,N) and other providers 455(1)-(N) to purchase the products, services and the like necessary to fulfill their needs in responding to the given request, in the manner of buyer portal 415. An example of such a commerce community is depicted in FIG. 4B, which is now described.

Figure 4B:
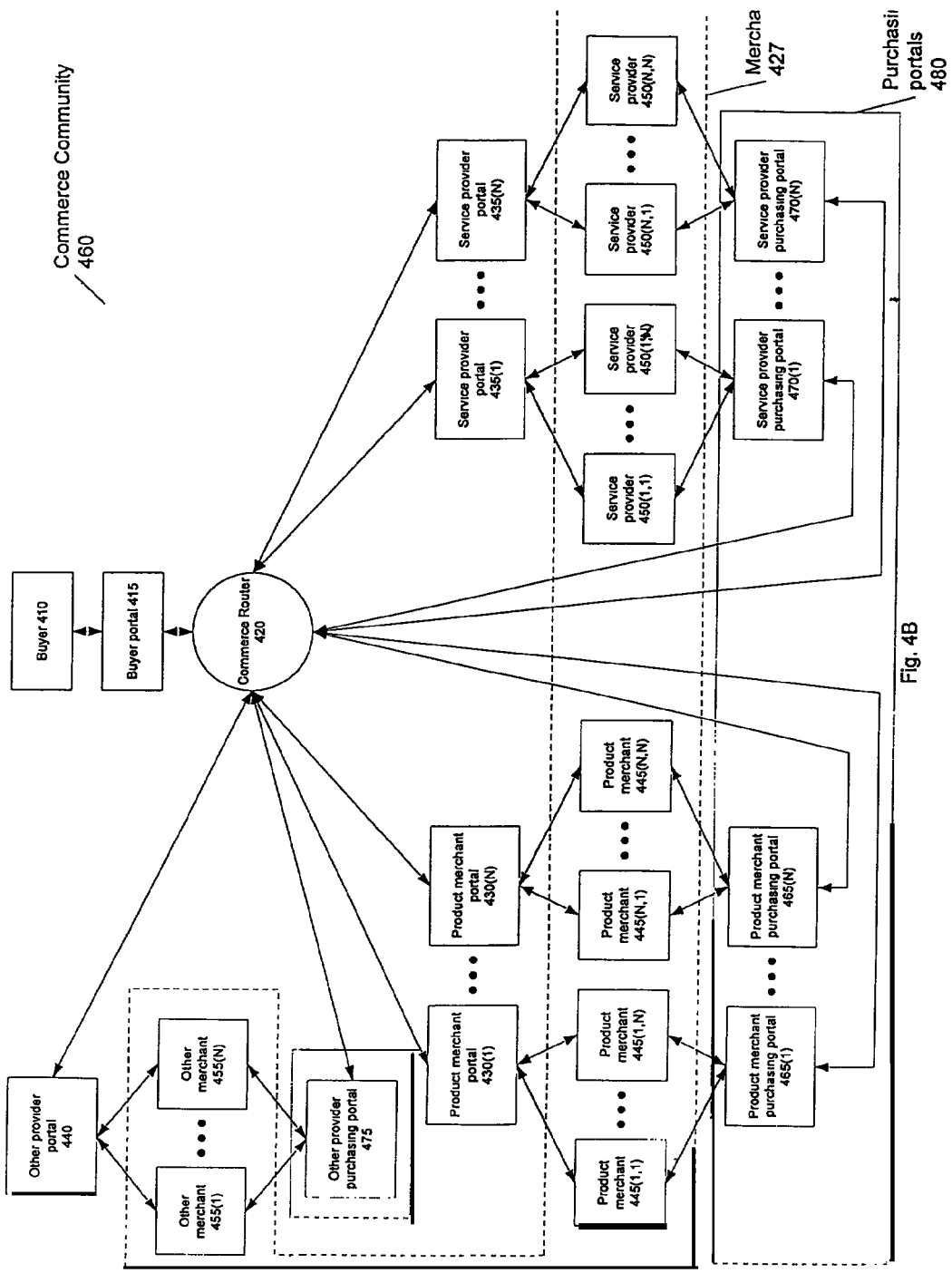
FIG. 4B is a block diagram illustrating an example commerce community that includes a commerce router according to an embodiment of the present invention.

FIG. 4B is a block diagram illustrating an example commerce community 460. In addition to the elements depicted in FIG. 4A, commerce community 460 includes product merchant purchasing portals 465(1)-(N), service provider purchasing portals 470(1)-(N) and an other provider purchasing portal 475, referred to collectively as purchasing portals 480. Once one or more of merchants 427 receive their respective requests or sub-requests, the given merchants can access purchasing portals 480 in order to submit requests for products, services and the like necessary to fulfill their needs in responding to the given request. Other of merchants 427, in turn, can then respond to these requests. This process can extend from buyer 410 (who can be, for example, an end-user or reseller) to a component parts manufacturer. In fact, the capabilities of commerce router 420 allow all commercial transactions carried out by a business or person to be transacted.

An example of such a set of commercial transactions is the purchase of office space having a networked computer system. Buyer 410 submits an RFI, requesting information on such office space, computers, software and networking equipment, to commerce router 420. From the request, commerce router 420 determines that, in addition to submitting a request for rental office space, the purchase of real estate and the construction of office space may provide a commercially preferable solution. This being the case, in addition to submitting an RFI for rental office space, commerce router 420 can, for example, submit RFIs for the purchase of land and construction of the office space, or an RFI for completed offices (e.g., for purchase or lease). With regard to the networked computer system, commerce router 420 further determines that buyers purchasing a networked computer system of such complexity typically need installation, training, technical support and maintenance services. Commerce router 420 thus submits RFIs for installation, training, technical support and maintenance services for the networked computer system and associated software.

The various RFIs are routed to the appropriate portals, where they are presented to merchants that provide the respective product, service or the like. Those of merchants 427 wishing to provide information in response to the RFIs do so, and the responses are reviewed by buyer 410. At this point, buyer 410 may decide to use some or all of the responses in creating an RFP or RFQ (or RFS). Alternatively, if buyer 410 is satisfied with the responses to the original RFI, buyer 410 may simply choose to convert the RFI to an RFP or RFQ (or RFS). Assuming that buyer 410 generates an RFQ/RFS that includes purchase of a completed office building for purchase, computers, software, networking equipment, computer and network installation, training and maintenance services.

In such a scenario, the RFQ for the purchase of the completed office building goes to other provider portal 440, to be bid on by one or more of other merchants 445(1)-(N). In turn, those of other merchants 445(1)-(N) bidding on the completed office building submits, via other provider purchasing portal 475, an RFQ for the requisite commercial real estate and an RFS for the requisite construction services needed to construct the office building. The RFQ and RFS are then processed by commerce router 420. The RFQ can be presented on other provider portal 440 for bid by those of other merchants 445(1)-(N) in the commercial real estate field. The RFS can be presented on one or more of service provider portals 435(1)-(N) for bid by those of service providers 450(1,1)-(N,N) in the construction field. The merchant responding to the construction RFS will likely be some sort of general contractor, who can then use one of service provider purchasing portals 470(1)-(N) to obtain bids for the various services required in the construction of the office building (e.g., construction of the structure, electrical systems, plumbing systems, HVAC systems, interior design, landscaping and so on). Such a request can be issued using commerce router 420 and then presented on one or more of service provider portals 435(1)-(N) for bid by sub-contractors (i.e., one or more of service providers 450(1,1)-(N,N)). Alternatively, the use of a general contractor can be avoided by commerce router 420 breaking out the various services and presenting (via service provider portals 435(1)-(N)) RFSs for the services to merchants (e.g., sub-contractors) capable of performing such services (e.g., one or more of service providers 450(1,1)-(N,N)).

With regard to networked computer system, RFQs are submitted to one or more of product merchant portals 430(1)-(N) with regard to the necessary computers, software and networking equipment. Those of product merchants 445(1,1)-(N,N) reviewing the RFQs and responding can offer products originating with that merchant, or (as will often be the case) submit RFQs for products from other of product merchants 445(1,1)-(N,N), via product merchant purchasing portals 465(1)-(N). If those of product merchants 445(1,1)-(N,N) responding to the RFQs elect to submit RFQs of their own via product merchant purchasing portals 465(1)-(N) for various elements of the original RFQ, these new RFQs flow through commerce router 420 and product merchant portals 430(1)-(N) for bid by other of product merchants 445(1,1)-(N,N). This process can repeat indefinitely, with resellers issuing RFQs to distributors, distributors issuing RFQs to OEMs and so on.

Alternatively, commerce router 420 can break down an RFQ such as this into its respective components. For example, commerce router 420 can convert an RFQ for a computer into an RFQ for the necessary computer components and an RFS the services required to assemble those components into the requested computer. In fact, any product or the like which can be broken down into components which can then be assembled into the desired good can be treated in this manner. Also, depending on the channel relationships in place, each level of RFQs can be presented to more than one level of the sales channel. For example, a reseller may issue an RFQ for computers that is presented both to distributors and direct manufacturers, where the direct manufacturers are also OEMs for computers sold by the distributor. This is true for any requests handled by commerce router 420.

In a fashion similar to that of the RFQ, RFSs are submitted to one or more of product merchant portals 430(1)-(N) with regard to the necessary installation, training and maintenance services. The services proffered in response to the RFSs may also be grouped together (e.g., installation and maintenance) to provide a better bargain for buyer 410. Thus, as with any request in commerce community 460, the RFSs may be responded to in any commercially reasonable manner. Also, such services can be provided by any of merchants 427 that have the capability to provide such services. This leads to a situation where, depending on a given merchant's capabilities, that merchant might respond to parts of the RFQ and parts of the RFS as well. For example, a reseller may respond to the RFQ for computers and the RFS for installation, while a distributor may respond to the reseller's RFQ for computers by providing the requisite software pre-installed on the computers. Thus, any of merchants 427 may offer any combination of products, services and the like via commerce router 420 in commerce community 460 that meet the needs identified by buyer 410 or another of merchants 427.

It will be noted that, if it is assumed that providers of all products, services and the like that may be desirable to buyer 410 are represented in commerce community 460, buyer 410 is able to transact all the desired purchases/transactions using commerce community 460. It also follows that all commercial transactions by product merchants 445(1,1)-(N,N), service providers 450(1,1)-(N,N) and other providers 455(1)-(N) may be transacted using commerce community 460. This leads to an economic model in which all transactions carried out in an industry can be supported by one or more commerce routers (e.g., commerce router 420). This is especially true in the case where commerce router 420 provides electronic access to financial institutions, in which case the procurement of products, services and the like can be handled entirely in electronic form. This capability extends to the entire sales channel because the entire sales channel can be supported using commerce router 420, as noted.

It will be noted that FIG. 4B is organized such that requests and sub-requests flow in a circular path, once buyer 410 issues the original request, flowing from commerce router 420, through merchant portals 426, to merchants 427. From merchants 427, requests flow through purchasing portals 480, back to commerce router 420, through merchant portal 426 and back to merchants 427. This is not the only structure possible for commerce community 460. For example, commerce community 460 could be structured such that buyer 410 (e.g., a computer reseller) interfaced with a first commerce router, which in turn interfaced with a first set of merchant portals to present requests to a first set of merchants (e.g., distributors). The first set of merchants would then interface with a first set of purchasing portals, which would interface with a second commerce router, which in turn would present such requests to a second set of merchants (e.g., OEMs). This type of structure could be duplicated repeatedly, providing support for an entire sales channel. This structure is also extensible to provide support for both horizontal and vertical markets.

Figure 5:
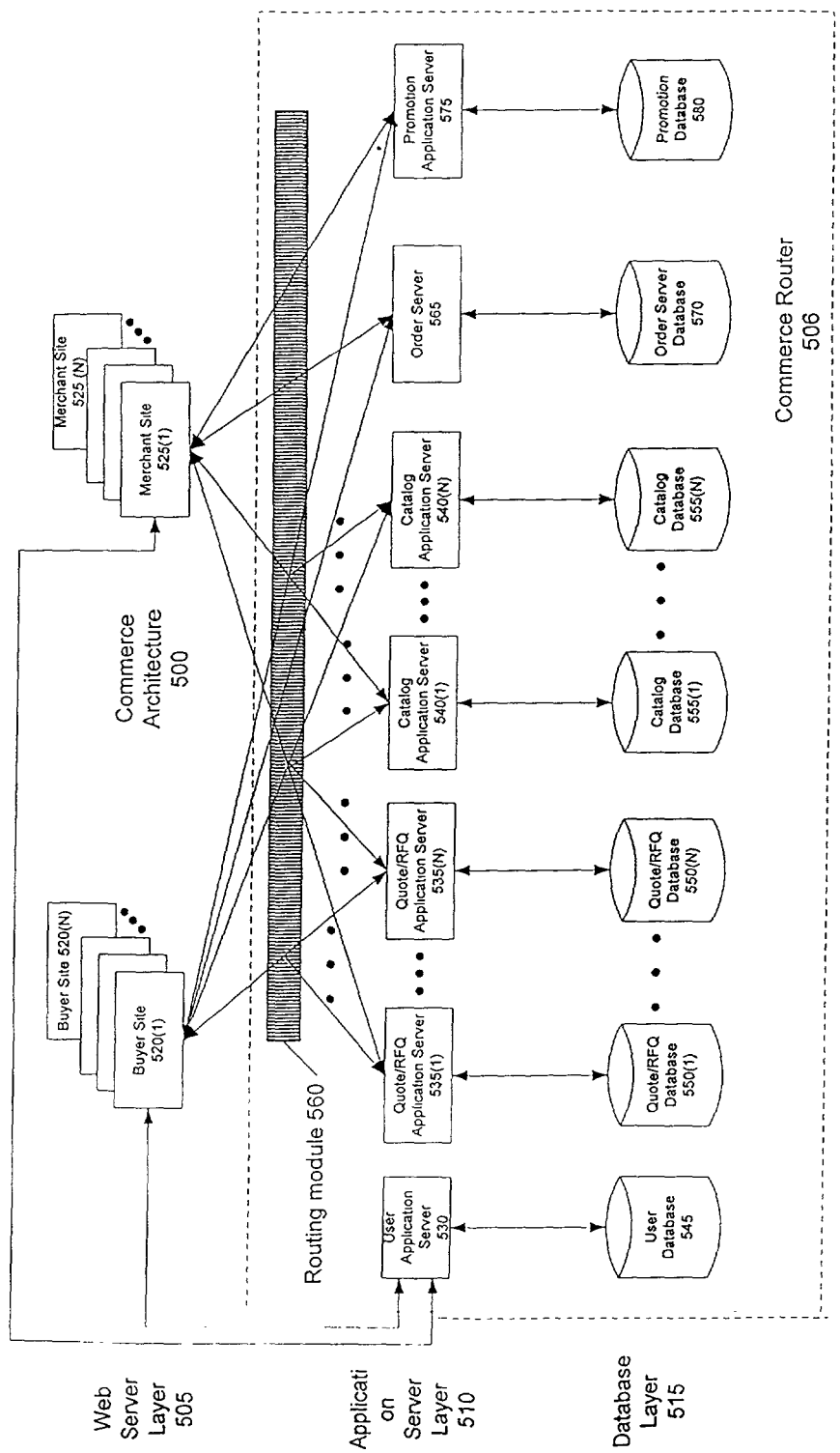
FIG. 5 is a block diagram illustrating a commerce architecture in which a commerce router according to an embodiment of the present invention is shown in further detail.

FIG. 5 is a block diagram illustrating an example commerce architecture 500. As depicted in FIG. 5, commerce architecture 500 is divided into a web server layer 505 and a commerce router 506. Commerce router 506 can be partitioned into an application server layer 510 and a database layer 515. While the application servers of application server layer 510 and the databases of database layer 515 are shown as being included in commerce router 506, it will be apparent to one of skill in the art that the modules that make up each of these layers can be apportioned and combined in a number of ways. For example, the functionality provided by the servers in application server layer 510 could be moved out of commerce router 506 and merged into the servers of web server layer 505. It is preferable, however, that the functionality provided by the servers in application server layer 510 be separate from the servers in web server layer 505, and be included in commerce router 506. By separating the functionality provided by web server layer 505 and application server layer 510, the need to replicate the functionality of the servers in application server layer 510 is avoided. In the commerce architecture depicted in FIG. 5, web server layer 505 includes buyer sites 520(1)-(N) and merchant site 525(1)-(N). Application server layer 510 includes a user application server 530, response/request application servers 535(1)-(N) and catalog application servers 540(1)-(N). Database layer 515 includes databases that store the information necessary to the operation of commerce architecture 500. These databases include a user database 545, response/request databases 550(1)-(N) and catalog databases 555(1)-(N). These application servers and databases are included in commerce router 506, as noted.

In a network environment, commerce architecture 500 supports the quotation process by allowing a buyer to log into one of buyer sites 520(1)-(N), which are web sites that allow a buyer to create and issue various requests. For the sake of simplicity, the discussions herein are in terms of requests for quotation (RFQ), or more simply, requests. As noted, the term "RFQ" (as used herein) is understood to include, but not be limited to, requests for quote, request for services (RFS), request for information (RFI), request for proposal (RFP) and the like, and is not to be limited to a legal understanding of such terms. Thus, buyer sites 520(1)-(N) provide the functionality necessary for a buyer to create such a request (e.g., an RFQ). In similar fashion, merchant sites 525(1)-(N) allow a merchant to login to such a web site, retrieve information regarding various requests existing in commerce architecture 500 and respond to one or more of those requests by submitting a bid to the corresponding buyer. To support the functionality presented by web server layer 505 and the sites therein, application server layer 510 preferably provides at least minimal amount functionality. Primary components include the administration of user accounts (provided in commerce architecture 500 by user application server 530), information regarding products for which bids may submitted (provided by catalog application servers 540(1)-(N)) and, most importantly, the functionality required to accept and promulgate both requests and bids (provided by response/request application servers 535(1)-(N)).

Each of the application servers in application server layer 510 typically communicates with one or more databases in database layer 515. In the example configuration of commerce architecture 500, each application server in application server layer 510 communicates with a corresponding database in database layer 515. As has been noted, this is a simplification made to facilitate the present discussion. As such, however, the functionality provided to buyer site 520 and merchant site 525 by the application servers of application server layer 510 do indeed depend on the underlying information stored in the databases of database layer 515. User application server 530 stores and retrieves information in user database 545 that allows user application server 530 to provide the functionality used in administering user accounts for both buyers and merchants. Catalog application servers 540 (1)-(N) store information to and retrieve information from catalog databases 555(1)-(N) in order to provide product information to buyers accessing buyer sites 520(1)-(N) and merchants accessing merchant sites 525(1)-(N). Such information can include product specifications (e.g., data sheets), pricing and availability, depending on whether catalog application servers 540(1)-(N) are providing information to buyer sites 520(1)-(N) or merchant sites 525(1)-(N). The core functionality of commerce architecture 500 is provided by commerce router 506, and more particularly by response/request application servers 535(1)-(N), which accesses response/request databases 550(1)-(N) to support the receipt and destination of requests and bids in response thereto.

As illustrated in FIGS. 4A and 4B, a commerce router according to embodiments of the present invention (e.g., commerce router 506) supports the submission of requests for products, services and/or the like, as well as the submission of responses by merchants in a number of products, services or other areas. This is depicted in FIG. 5 by the existence of response/request application servers 535(1)-(N) and catalog application servers 540(1)-(N), as well as the existence of response/request databases 550(1)-(N) and catalog databases 555(1)-(N). For example, transactions involving each product, service or other area can be supported by a single response/request application server, or (as depicted in FIG. 5) by a number of such servers (e.g., response/request application servers 535(1)-(N)). In the latter configuration, a given request or sub-request is routed to one or more of response/request application servers 535(1)-(N) by a routing module 560, which can also be configured to handle catalog searching/browsing requests to be sent to one or more of catalog databases 555(1)-(N) via catalog application servers 540(1)-(N). Access to various ones of response/request application servers 535(1)-(N) (and so corresponding ones of response/request databases 550(1)-(N)) is restricted to appropriate merchants by properly configuring such access via corresponding ones of merchant sites 525(1)-(N). Just as separate databases can be maintained for requests and responses for various types of product, service or other requests (e.g., response/request databases 550(1)-(N)), separate databases can be maintained for catalogs holding information regarding various types of products, services or other items. This configuration is depicted in FIG. 5 as catalog databases 555(1)-(N), each of which is capable of holding information, such as that previously described, for a given product, service or other item. It will be apparent to one of skill in the art that response/request application servers 535(1)-(N) and catalog application servers 540(1)-(N) (as well as the existence of response/request databases 550(1)-(N) and catalog databases 555(1)-(N)) can be combined into a single application server (catalog), with no effect on the operation of commerce architecture 500 or commerce router 506, or the functionality provided thereby.

Also provided is an order server 565 (which accesses an order database 565) and a promotion application server 575 (which accesses a promotion database 580), to which buyer sites 520(1)-(N) and merchant sites 525(1)-(N) have access. Order server 565 allows responses to be fulfilled by supporting an ordering process, once a response to a request is selected as a winning response. Order server 565, in conjunction with order database 565 (which maintains information regarding such orders), allows a buyer (and merchant) to conclude the purchase of the product(s), service(s) and/or other item(s). This results in a totally electronic process for handling RFIs, RFPs, RFQs, RFSs, purchases and the like. As noted elsewhere herein, commerce router 506 can also be configured to handle the serving of promotional materials, such as advertisements, delivery of promotional materials and the like. This functionality is provided by promotion application server 575, which serves such information by accessing information stored in promotion database 580. This allows leads, generated by such promotional presentations to be shared among users of the system (merchants and buyers) This is particularly useful because such leads can be transferred up and down the sales channel using a commerce router such as commerce router 506.

Figure 6:
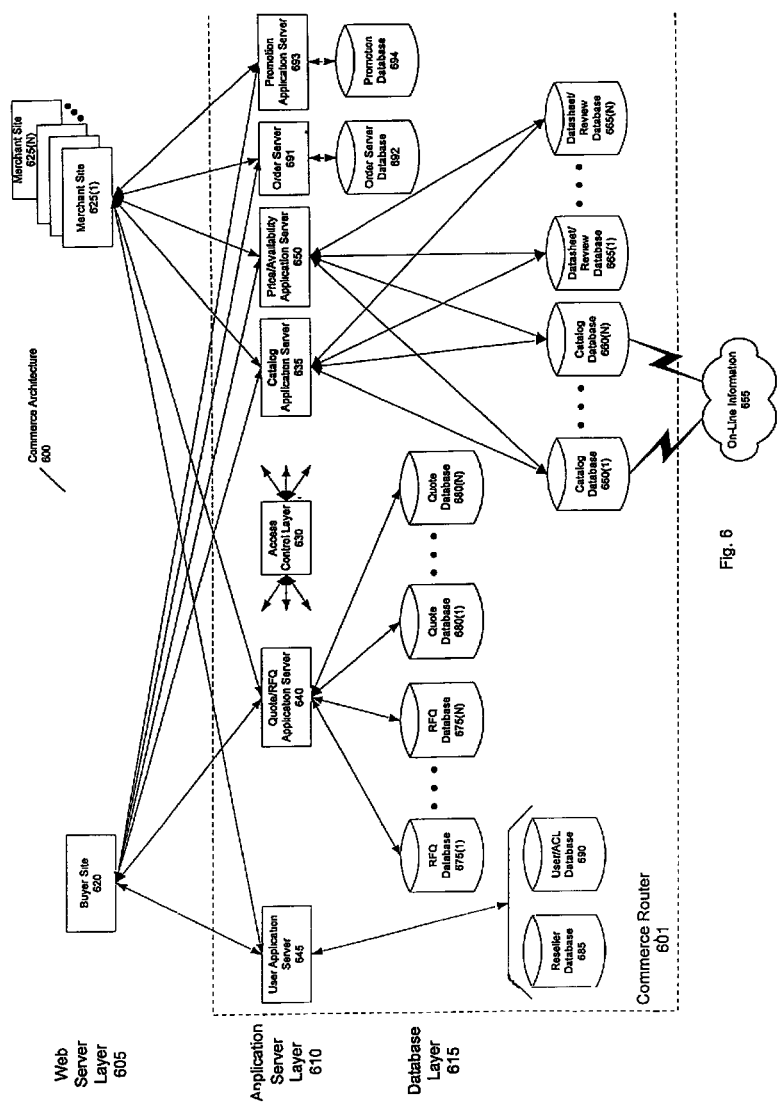
FIG. 6 is a block diagram illustrating a commerce architecture in which a commerce router according to an embodiment of the present invention is shown in yet more detail and provides additional functionality.

FIG. 6 is a block diagram illustrating a commerce architecture 600 that is similar in the form to commerce architecture 500, but provides additional modules within a commerce router 601 in order to support additional functionality. Moreover, commerce architecture 600 represents an extension of commerce architecture 500 by allowing access to such a system from multiple buyer sites and/or multiple merchant sites. As before, commerce architecture 600 is divided into three layers, a web server layer 605, and application server layer 610 and a database layer 615. In this scenario, web server layer 605 supports multiple web sites, both on the buyer side and on the seller side. These appear in FIG. 6 as buyer sites 620(1)-(N) and merchant sites 625(1)-(N). The operation of commerce architecture 500 is optimized by the separation of web server layer 605 and application server layer 610. This is because the functionality of application server layer 610 is centralized, rather than being distributed (i.e., replicated in each of buyer sites 620(1)-(N) and merchant sites 625(1)-(N)). Application server layer 610 provides expanded functionality both in the information provided to buyers and merchants, as well as in the administration of commerce architecture 600. As before, a user application server 630 is provided to support the creation and maintenance of buyer and merchant accounts (including the features available, access privileges and the like). Also as before, a catalog application server 635 is provided to allow both buyers and merchants access to information regarding the products (and/or services, and/or any other commercially salable good or service) that is to make up a request or bid (response). To support the request and quotation process, a response/request application server 640 is also provided. As before, response/request application server 640 forms the core of commerce architecture 600 by supporting the receipt and dissemination of requests and bids.

Additionally, commerce architecture 600 includes two other application servers in application server layer 610. These are an access control layer 645 and a price/availability application server 650. Access control layer 645 controls access to the various web sites and databases that make up commerce architecture 600. This control includes setting access privileges to buyer sites 620(1)-(N) and merchant sites 625(1)-(N), access privileges to various features of these sites (e.g., including the searching of databases, various price lists, products and related sub-components and other such parameters), historical information on buyer and seller activity, and other such information. Price/availability application server 650 provides access to various kinds of information regarding the price and availability of products, services and the like offered via commerce router 601 to buyers and merchants accessing commerce router 601. This access can be varied by the identity of the party requesting such information. For example, a buyer accessing one of buyer sites 620(1)-(N) may be allowed to request information regarding street pricing on one or more products (or services). Such information may be retrieved from one or more of the databases in database layer 615, or maybe acquired via a live connection to on-line information (e.g., on-line information 655). Similarly, a merchant accessing one of merchant sites 625(1)-(N) could require information regarding the availability of one or more products requested by a buyer. The merchant could also require pricing information regarding those products or services. It will be noted that the information available to a buyer will typically differ in at least some respects from that available to a merchant.

Using the preceding examples, it will be understood that a buyer will often want access to street pricing (i.e., example pricing from one source or another that provides the buyer with an estimate as to the price of the product or service desired). In contrast, a merchant will need information regarding the actual price, and also the availability, of the requested products or services from the providers servicing that merchant. In the latter case, on-line information 655 will include dynamic information such as the actual price and availability of the requested product or service from one or more of the merchant's suppliers.

As will be noted, many of the databases that make up database layer 615 are also included in database layer 515 in FIG. 5. However, unlike commerce router 506 of FIG. 5, access to these databases in commerce router 601 is consolidated into single application servers (i.e., catalog application server 635, response/request application server 640 and (the additional) price/availability application server 650). Catalog application server 635 accesses one of catalog databases 660(1)-(N) in order to allow a buyer to browse and/or search for information regarding the various products, services and the like available through commerce router 601. Also provided are data sheet/review databases 665(1)-(N), which include a wide array of information regarding the products, services and/or the like listed in catalog databases 660(1)-(N). Data sheet/review databases 665(1)-(N) include information such as datasheets (information regarding the specifications and other characteristics of a given product, service or the like) and reviews of those products (or services or the like) by experts, for example. AS in FIG. 5, multiple catalog databases and data sheet/review databases are depicted in FIG. 6 to demonstrate that multiple product categories, service categories and/or other categories are available via commerce router 601. Thus, each of catalog databases 660(1)-(N) and data sheet/review databases 665(1)-(N) represents information (catalog information, data sheet information, review information and the like) is available to catalog application server 635 and price/availability application server 650.

As noted, the apportioning of information among the databases of database layer 615 may take several fauns, and this becomes apparent when comparing database layer 615 to database layer 515. Database layer 615 is made up of a number of databases, including request databases 675(1)-(N), response databases 680(1)-(N), a reseller database 685 and a user database 690. As before, user database 690 maintains information regarding buyer and merchant accounts. In a fashion similar to response/request databases 550(1)-(N) of FIG. 5, request databases 675(1)-(N) and response databases 680(1)-(N) maintain information regarding requests and bids submitted by buyers and merchants, respectively. As discussed with regard to catalog databases 660(1)-(N) and data sheet/review databases 665(1)-(N), request databases 675(1)-(N) and response databases 680(1)-(N) are depicted as including a number of request and response databases, respectively, to evidence support of multiple types or products, services and/or other items. One of the capabilities provided by request databases 675(1)-(N) is the ability to use a preexisting request as the basis for generating a new request. Request databases 675(1)-(N) maintain information regarding requests submitted by buyers using one or more of buyer sites 620(1)-(N). In similar fashion, response databases 680(1)-(N) maintain information regarding responses submitted by merchants via one or more of merchant sites 625(1)-(N) with regard to a number of products, services and/or other items. This functionality is supported by the storage to and retrieval from request databases 675(1)-(N) and response databases 680(1)-(N) using response/request application server 640.

Also provided is an order server 691 (which accesses an order database 692) and a promotion application server 693 (which accesses a promotion database 694), to which buyer site 620 and merchant sites 625(1)-(N) have access. These application servers and databases provide functionality such as that described in connection with FIG. 5.

Figure 7:
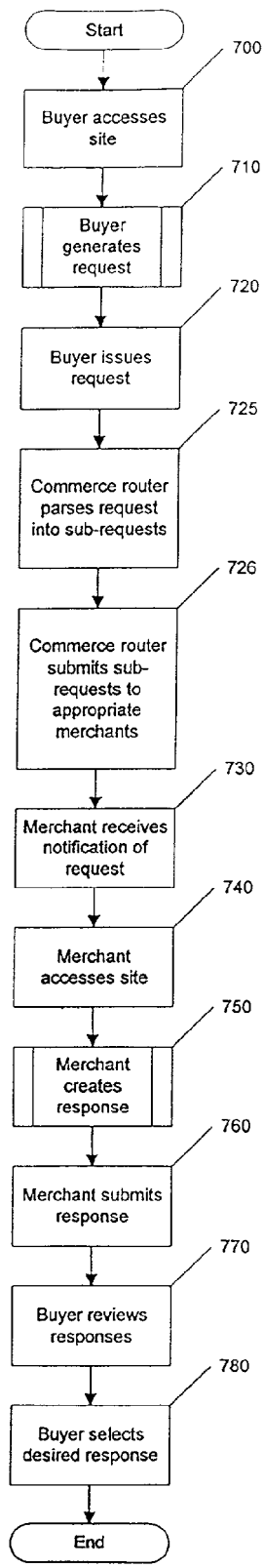
FIG. 7 is a flow diagram illustrating a process according to one embodiment of the present invention.

FIG. 7 is a flow diagram illustrating an process according to one embodiment of the present invention. The process of submitting a request and receiving responses on that request begins with the buyer accessing a buyer's website such as one of buyer sites 520(1)-(N) (step 700). As will be apparent, the process depicted in FIG. 7 is discussed in terms of commerce architecture 600 and elements thereof. Next, the buyer generates a request (step 710). The process of generating a request is depicted in greater detail subsequently in FIG. 8, as well as with regard to the flow diagrams and related screen layouts that appear subsequently herein. Once a request has been generated, the buyer issues the request, which sends the request out to the selected merchants for their responses (step 720).

The ability to generate and issue a request is provided in FIG. 6 by response/request application server 640 and request databases 675(1)-(N), among other elements of commerce router 601. Commerce router 601 also facilitates the handling of the request by parsing the request into sub-requests that can be directed to one or more of merchant websites 625(1)-(N) capable of providing the necessary products, services or other items (step 725). Once commerce router 601 generates such sub-requests, commerce router 601 submits these various sub-requests to merchant websites 625(1)-(N) for responses thereon by the appropriate merchants (step 726).

In order to apprise the merchants of the new request, merchants are sent and subsequently receive notification of the request (step 730). This notification process can take many forms, but is discussed here in terms of e-mails sent to the selected merchants. Having received their respective e-mails, the selected merchants may then access a merchant site (e.g., merchant sites 525(1)-(N) in order to view and respond to the request received (step 740). Next, having reviewed the request, the merchant creates a response in response thereto (step 750). The process of creating a response is depicted in greater detail in FIG. 9.

Once the merchant's bid has been created, the merchant submits the bid to the respective buyer in response to that buyer's request (step 760). Once the buyer has received the requested responses, the buyer reviews these responses (and other associated responses (e.g., installation services requested along with a request directed to computer systems) to determine if one of the responses in the given category is acceptable (step 770). Based on this review, the buyer then selects the winning response (or responses) (step 780). Again, the process of submitting a response to the request and the review of those responses by the buyer is supported by various of the elements of commerce architecture 500, including response/request application server 640, response databases 680(1)-(N) and request databases 675(1)-(N). While not illustrated, the process depicted in FIG. 7 can be extended to include the buyer's submission of a purchase request (e.g., an order accompanied by credit card information, a purchase order number or other evidence of payment for the products (or services or the like)) for the products (or services or the like) listed in the request (or response, if the request and response differ). It will also be noted that the process depicted in FIG. 7 includes the actions performed in creating, submitting, responding to and selecting a winning response. Numerous other possible actions (deleting a request prior to issuance, withdrawing a request, selecting a winning response prior to all responses being received (by altering the due date or by other method) and the like) can also be performed (not shown).

As noted, FIG. 7 depicts a flow diagram illustrating a request process according to one embodiment of the present invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into sub-modules to be executed as multiple computer processes. Moreover, alternative embodiments may combine multiple instances of a particular module or sub-module. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of FIG. 7 may be executed by a module (e.g., a software module) or a portion of a module or a computer system user using, for example, a computer system such as the storage router previously mentioned, or a similar network element, as well as a computer system such as computer system 210. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media; optical storage media such as compact disk media (e.g., CD-ROM, CD-R, etc.) and digital video disk storage media; nonvolatile memory storage memory including semiconductor-based memory units such as FLASH memory, EEPROM, EPROM, ROM or application specific integrated circuits; volatile storage media including registers, buffers or caches, main memory, RAM, etc.; and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Figure 8:
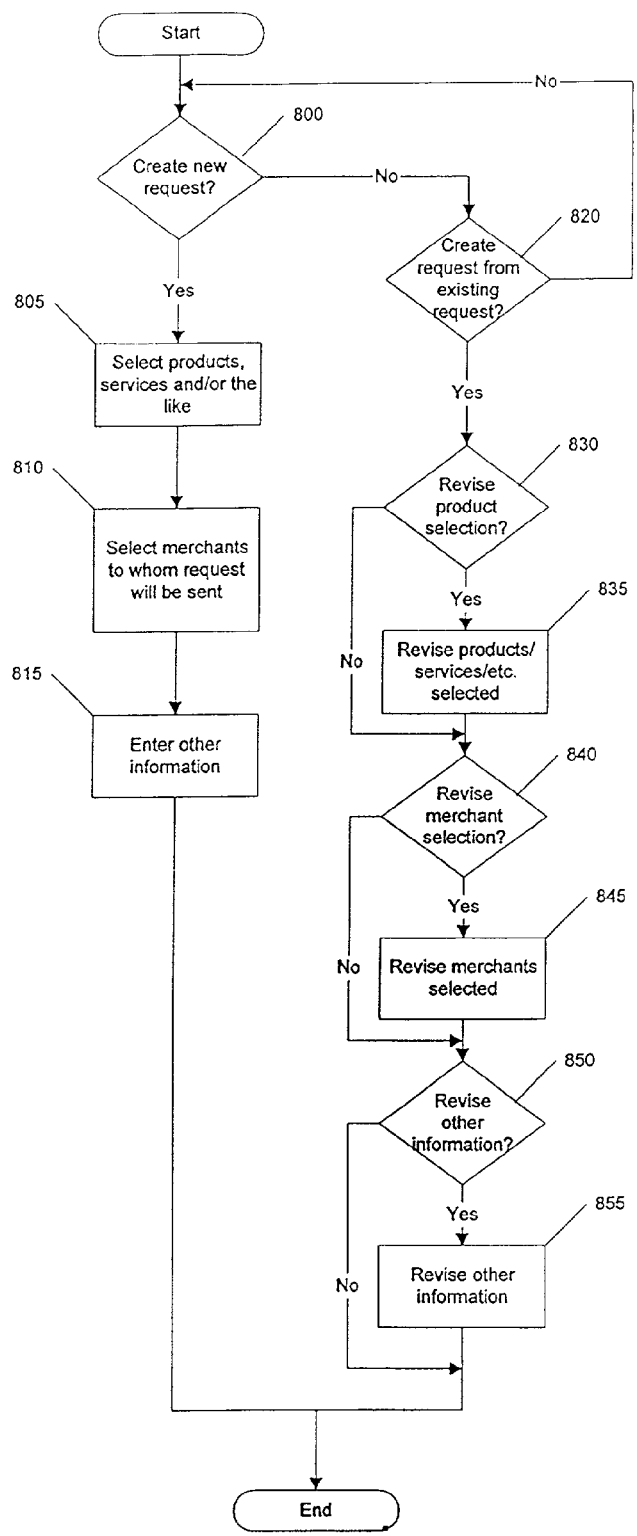
FIG. 8 is a flow diagram illustrating example actions performed in the generation of a request according to one embodiment of the present invention.

FIG. 8 is a flow diagram illustrating example actions performed in the generation of a request. The process begins with the buyer deciding on whether or not to create a new request (step 800). If the buyer wishes to create a new request, the buyer selects products, services and/or the like based on those products, services or the like in the catalogs available to the buyer (e.g., catalog databases 660(1)-(N), which are accessed via catalog application server 535) (step 805). The buyer may also select merchants to whom the request (or sub-requests) will be sent based on criteria the buyer selects (step 810). Such criteria may include merchant location, hours of operation, technical service capabilities, affiliations, existing relationship with the buyer and other such criteria. Once product/service/etc. and merchant information have been entered, other information such as delivery requirements, specific instructions regarding quotation or other such information may be entered (step 815).

If the buyer does not wish to create a new request (step 800), the buyer may instead choose to create a request from an existing request by making a copy of the existing request (step 820). If neither of the selections are desired by the buyer, the controller may simply revert to querying the buyer as to the buyer's desire to create a new request. Assuming that the buyer wishes to create a request from an existing request (step 820), the buyer will be queried as to whether they wish to revise the product selection in the copied request (step 830). If the user wishes to revise the selection of products, services and/or other items in some way, the buyer is allowed to do so at this time (step 835). If the buyer does not wish to make revisions to the prior selection or has done so to their satisfaction, the buyer is queried as to any changes in the merchants selected in the copied request (step 840). If the buyer wishes to alter the merchants selected in the copied request, the buyer is allowed to do so at this time (step 845). If the buyer does not wish to make such revisions or is satisfied with the revisions made, the buyer is then queried as to any alterations desired of the existing information (other than product and merchant selection) (step 850). If information other than product and merchant selection is to be changed, the buyer is allowed to make such changes at this time (step 855). At this point, the request is ready to be issued by the buyer, as is depicted in FIG. 8. One of skill in the art that will realize that the process depicted in FIG. 8 is merely an example, and that process steps may be rearranged, added or deleted while remaining with the scope of embodiments of the present invention.

Figure 9:
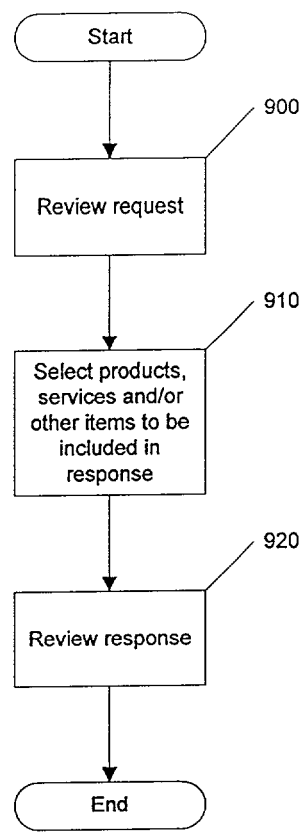
FIG. 9 is a flow diagram illustrating an example process of the creation of a response by a merchant according to one embodiment of the present invention.

FIG. 9 is a flow diagram illustrating an example process of the creation of a response by a merchant, in a simplified form. The process begins with the merchant's review of the request in question (step 900). The merchant then selects products, services and/or other items in order to provide an acceptable response to the buyer's request (step 910). In selecting products, services and/or other items, the merchant may choose to provide such products, services and/or other items which are identical to those in the request, or may respond with products, services and/or other items either different from those in the request or in addition to those in the request, or may simply decide to delete certain products, services and/or other items from the request (and so not provide one or more products, services and/or other items therein). Once the merchant has created a response, they may review the response for accuracy and completeness (step 920). As noted previously, the process depicted in FIG. 9 is merely an example, and does not include all of the possible actions that a merchant might take in response to a request.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A commerce router comprising:
    a computer readable medium comprising code executable by a processor, wherein the code comprises a module to receive a first request from a buyer web site;
    a plurality of commercial transaction databases, wherein each one of the databases contains commercial transaction information related to one of a plurality of offering types;
    wherein the code further comprises:
    a module to store the first request in at least one of the commercial transaction databases;
    an application server module, communicatively coupled to each one of the databases, to access the first request in at least one of the commercial transaction databases and to process the first request to generate a processed request;
    wherein to generate the processed request, the application server module includes code to review the first request, determine if one or more additional requests for one or more related items can be added to the first request, and to automatically generate the one or more additional requests for the one or more related items if a determination is made that the one or more additional requests can be added to the first request, wherein the related items are selected from a group consisting of products and services; and
    a web server module to provide the processed request including the one or more additional requests to at least one provider web site, wherein each, single, provider web site supports, for one or more providers, access to the provider web site to allow at least one of the one or more providers to respond to the processed request.

2. The commerce router of claim 1, wherein
    the application server module is configured to receive the first request by virtue of being configured to communicate information regarding the first request to the database for inclusion in the commercial transaction information,
    the application server module is configured to allow review of the first request by virtue of being configured to communicate information regarding the first request from the database by accessing the commercial transaction information,
    the application server module is configured to receive a response by virtue of being configured to communicate information regarding the response to the database for inclusion in the commercial transaction information, and
    the application server module is configured to allow review of the response by virtue of being configured to communicate information regarding the response from the database by accessing the commercial transaction information.

3. The commerce router of claim 1, wherein the offering types include a product and a service.

4. The commerce router of claim 1 wherein the first request is a member of the group comprising: request for quote, request for proposal, request for services, request for information, and request to browse a catalog.

5. The commerce router of claim 1 wherein the provider is a member of the group comprising: a product merchant and a service provider.

6. The commerce router of claim 1 wherein:
    to process the first request to generate a processed request comprises parsing the first request into multiple sub-requests; and
    the web server module is further configured to provide each sub-request to at least one provider web site; and
    wherein to provide the processed request including the one or more additional requests to at least one provider web site comprises to provide one or more of the sub-requests to one or more provider web sites; and
    wherein to allow at least one of the multiple providers to respond to the processed request comprises allowing one or more of the providers to respond to one or more of the sub-requests.

7. The commerce router of claim 1 wherein each of the modules comprises software code encoded in a computer readable media and executable by a processor.

8. The commerce router of claim 1 wherein the commercial transaction databases comprise a user database, a quote/request for quote database, a catalog database, order server database, and a promotion database.

9. The commerce router of claim 1 wherein the application server module comprises at least two members of a group comprising: a user application server, a quote/request for quote application server, a catalog application server, order server application server, and a promotion application server.

10. The commerce router of claim 1 further comprising:
    a memory;
    buyer preferences stored in the memory;
    wherein the application server module is further configured to add the additional requests for the one or more related items to the first request in accordance with the buyer preferences if a determination is made by the reviewer module that the one or more additional requests can be added to the first request.

11. The commerce router of claim 1 wherein:
the module to receive a first request from a buyer web site is further configured to receive additional requests transmitted by one or more buyers;
the application server module is further configured to process each request to generate a processed request, wherein the application server module includes a reviewer module to review at least a first subset of the additional requests and determine if one or more related items can be added to each request that is reviewed, to add the one or more related items to at least a second subset of the reviewed requests if a determination is made by the reviewer module that the one or more related items can be added, and the related items are selected from the group consisting of products and services; and
the web-server module is further configured to provide the additional processed requests to at least one provider web site to allow at least one provider to respond to the additional processed requests.

12. The commerce router of claim 1 further comprising:
using criteria set by the buyer to automatically generate the one or more additional requests.

13. A method of processing and routing commerce related requests to providers, the method comprising:
performing with code executable by a processor:
receiving a first request from a buyer web site;
storing the first request in at least one commercial transaction database;
accessing the first request in at least one of the commercial transaction databases;
processing the first request to generate a processed request, wherein processing the first request comprises:
reviewing the first request to determine if one or more additional requests for with one or more related items can be added to the first request; and
automatically generating the one or more additional requests for the one or more related items if a determination is made that the one or more additional requests can be added to the first request, wherein the related items are selected from a group consisting of products and services; and
providing the processed request including the one or more additional requests to at least one provider web site, wherein each, single, provider web site supports, for one or more providers, access to the provider web site to allow at least one of the one or more providers to respond to the processed request.

14. The method of claim 13 wherein the request is a member of the group comprising: request for quote, request for proposal, request for services, request for information, and request to browse a catalog.

15. The method of claim 13 wherein the provider is a member of the group comprising: a product merchant and a service provider.

16. The method of claim 13 wherein the code of the commerce router is further executable by the processor for:
parsing the processed request into multiple sub-requests; and
providing each sub-request to at least one of the provider web site, wherein to allow at least one of the multiple providers to respond to the processed request comprises each of multiple providers to respond to one of the sub-requests.

17. The method of claim 13 wherein the commercial transaction databases comprise a user database, a quote/request for quote database, a catalog database, order server database, and a promotion database.

18. The method of claim 13 wherein processing the first request further comprises processing first request using at least two members of a group comprising: a user application server, a quote/request for quote application server, a catalog application server, order server application server, and a promotion application server.

19. The method of claim 13 further comprising:
adding the additional requests for the one or more related items to the first request in accordance with predefined buyer preferences if a determination is made that the one or more additional requests can be added to the first request.

20. The method of claim 13 further comprising:
receiving additional requests transmitted by one or more buyers;
processing the additional requests to generate processed requests, wherein processing the additional requests comprises:
reviewing at least a subset of the additional requests to determine if one or more further requests for one or more related items can be added to at least the subset of the additional requests; and
generating the further requests with the one or more related items if a determination is made that the one or more further requests for one or more related items can be added to at least the subset of the additional requests, wherein the related items are selected from the group consisting of products and services; and
providing the processed additional requests to at least one provider web site to allow at least one of the multiple providers to respond to the processed additional requests.

21. The method of claim 13 wherein automatically generating the one or more additional requests further comprises:
using criteria set by the buyer to automatically generate the one or more additional requests.

22. A system for processing and routing commerce related requests to providers, the system comprising:
a processor;
a memory, coupled to the processor, comprising code encoded therein and executable by the processor to:
receive a first request from a buyer web site;
store the first request in at least one commercial transaction database;
access the first request in at least one of the commercial transaction databases;
process the first request to generate a processed request, wherein the code to process the request comprises code to:
review the first request to determine if one or more additional requests for with one or more related items can be added to the first request; and
automatically generate the one or more additional requests for the one or more related items if a determination is made that the one or more additional requests can be added to the first request, wherein the related items are selected from a group consisting of products and services; and
provide the processed request including the one or more additional requests to at least one provider web site, wherein each, single, provider web site supports, for one or more providers, access to the provider web site to allow at least one of the one or more providers to respond to the processed request.

23. The system of claim 22 further comprising code encoded in the memory to:
   parse the processed request into multiple sub-requests; and
   provide each sub-request to at least one of the provider web site, wherein to allow at least one of the multiple providers to respond to the processed request comprises each of multiple providers to respond to one of the sub-requests.

24. The system of claim 22, wherein the memory further comprises data specifying buyer preferences, and the code to process the first request further comprises code to:
   add the additional requests for the one or more related items to the first request in accordance with the buyer preferences if a determination is made that the one or more additional requests can be added to the first request.

25. The system of claim 22, wherein the code is further configured to:
   receive additional requests transmitted by one or more buyers;
   process the additional requests to generate processed requests, wherein processing the additional requests comprises:
      review at least a subset of the additional requests to determine if one or more further requests for one or more related items can be added to at least the subset of the additional requests; and
      generate the further requests with the one or more related items if a determination is made that the one or more further requests for one or more related items can be added to at least the subset of the additional requests, wherein the related items are selected from the group consisting of products and services; and
   provide the processed additional requests to at least one provider web site to allow at least one of the multiple providers to respond to the processed additional requests.

26. The system of claim 22 wherein the code is further executable by the processor to use criteria set by the buyer to automatically generate the one or more additional requests.

27. An apparatus for processing and routing commerce related requests to providers using a commerce router comprising code executable by a processor, the apparatus comprising:
   computer system means for receiving a first request from a buyer web site;
   computer system means for storing the first request in at least one commercial transaction database;
   computer system means for accessing the first request in at least one of the commercial transaction databases;
   computer system means for processing the first request to generate a processed request, wherein the means for processing the first request comprises:
   means for automatically reviewing the first request to determine if one or more additional requests for one or more related items can be added to the first request; and
   means for automatically generating the one or more additional requests for the one or more related items if a determination is made that the one or more additional requests can be added to the first request, wherein the related items are selected from a group consisting of products and services; and
   computer system means for providing the processed request including the one or more additional requests to at least one provider web site, wherein each, single, provider web site supports, for one or more providers, access to the provider web site to allow at least one of the one or more providers to respond to the processed request.

28. The apparatus of claim 27 further comprising:
   means for parsing the processed request into multiple sub-requests; and
   means for providing each sub-request to at least one of the provider web site, wherein to allow at least one of the multiple providers to respond to the processed request comprises each of multiple providers to respond to one of the sub-requests.

29. The apparatus of claim 27 further comprising:
   means for storing buyer preferences;
   wherein the means for processing is further configured for adding the additional requests for the one or more related items in accordance with the buyer preferences if a determination is made that the one or more additional requests can be added to the first request.

30. The apparatus of claim 27 further comprising:
   means for receiving additional requests transmitted by one or more buyers;
   means for processing the additional requests to generate processed requests, wherein processing the additional requests comprises:
      means for reviewing at least a subset of the additional requests to determine if one or more further requests for one or more related items can be added to at least the subset of the additional requests; and
      means for generating the further requests with the one or more related items if a determination is made that the one or more further requests for one or more related items can be added to at least the subset of the additional requests, wherein the related items are selected from the group consisting of products and services; and
   means for providing the processed additional requests to at least one provider web site to allow at least one of the multiple providers to respond to the processed additional requests.

31. The apparatus of claim 27 wherein the computer system means for processing the request further comprises:
   means for using criteria set by the buyer to automatically generate the one or more additional requests.

32. A computer readable medium comprising code encoded therein and executable by the processor to:
   receive a transmitted first request from a buyer;
   process the first request to generate a processed request, wherein the code to process the request comprises code to:
   automatically review the first request to determine if one or more additional requests for with one or more related items can be added to the first request; and
   automatically generate the one or more additional requests for the one or more related items if a determination is made that the one or more additional requests can be added to the first request, wherein the related items are selected from a group consisting of products and services; and
   provide the processed request including the one or more additional requests to at least one provider web site, wherein each, single, provider web site supports, for one or more providers, access to the provider web site to allow at least one of the one or more providers to respond to the processed request.

33. The computer readable medium of claim 32, wherein the code is further configured to:

receive additional requests transmitted by one or more buyers;

process the additional requests to generate processed requests, wherein processing the additional requests comprises:

review at least a subset of the additional requests to determine if one or more further requests for one or more related items can be added to at least the subset of the additional requests; and generate the further requests with the one or more related items if a determination is made that the one or more further requests for one or more related items can be added to at least the subset of the additional requests, wherein the related items are selected from the group consisting of products and services; and provide the processed additional requests to at least one provider web site to allow at least one of the multiple providers to respond to the processed additional requests.

34. The computer readable medium of claim 32 wherein the code is further executable by the processor to:

use criteria set by the buyer to automatically generate the one or more additional requests.

\* \* \* \* \*